May 5, 1925.

T. W. FOOTE

Re. 16,064

CHAIR BASE

Original Filed Dec. 23, 1918 2 Sheets-Sheet 1

INVENTOR
Thomas W. Foote,
BY Otto Munn
his ATTORNEY

May 5, 1925.

T. W. FOOTE

CHAIR BASE

Original Filed Dec. 23, 1918 2 Sheets-Sheet 2

Re. 16,064

INVENTOR
Thomas W. Foote
BY
his ATTORNEY

Reissued May 5, 1925. Re. 16,064

UNITED STATES PATENT OFFICE.

THOMAS W. FOOTE, OF CLEVELAND, OHIO.

CHAIR BASE.

Original No. 1,303,646, dated May 13, 1919, Serial No. 267,888, filed December 23, 1918. Application for reissue filed May 26, 1921. Serial No. 472,892.

*To all whom it may concern:*

Be it known that I, THOMAS W. FOOTE, a citizen of the United States, and a resident of Cleveland, county of Cuyahoga, and State of Ohio, have invented a new and useful Improvement in Chair Bases, of which the following is a specification.

The present invention relates to bases of the type used with revolving chairs, stools, costumers, and the like. The object of the invention is the provision of a base in which the legs are interconnected so as to make a neat, secure and easily assembled joint. Other objects are the provision of blocks which fit between the legs and engage therewith to make the joint more secure and these blocks also conceal the joints between the legs so as to give a finished appearance to the completed article. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Figure 1:
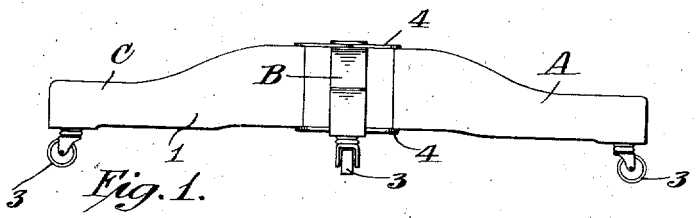
Figure 2:
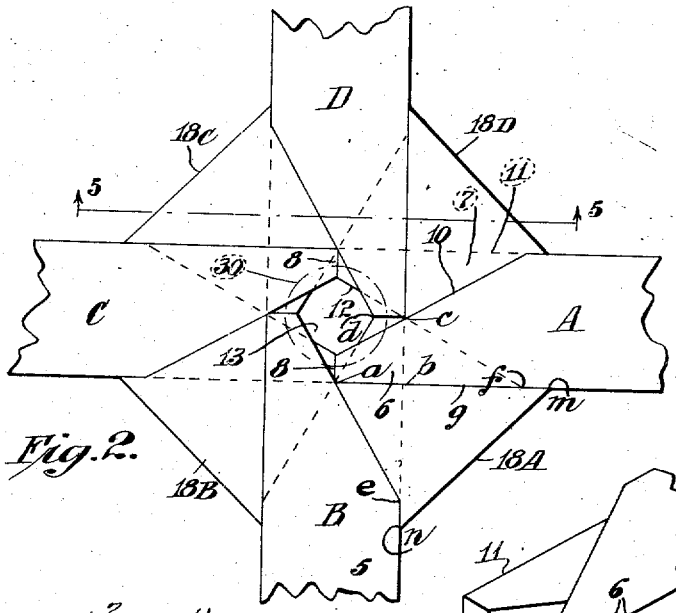
Figure 4:
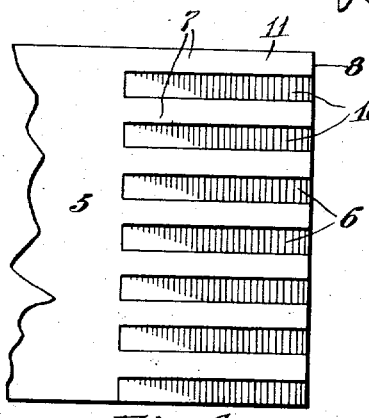
Figure 3:
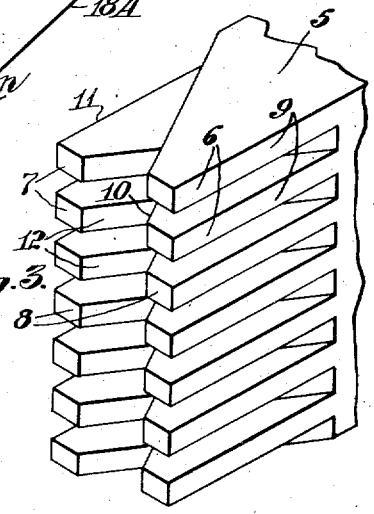
Figure 5:
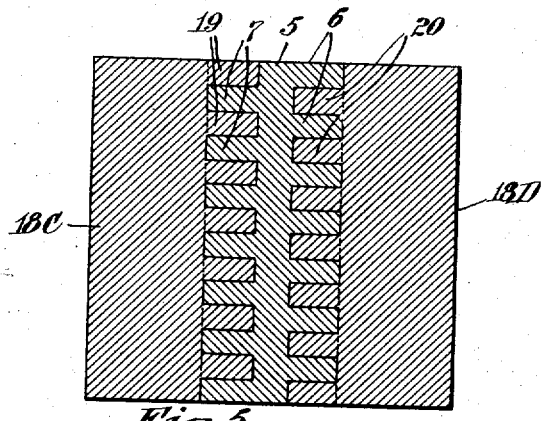
Figure 8:
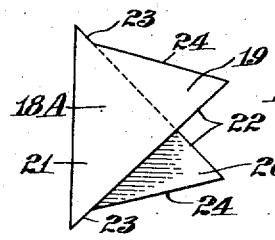
Figure 7:
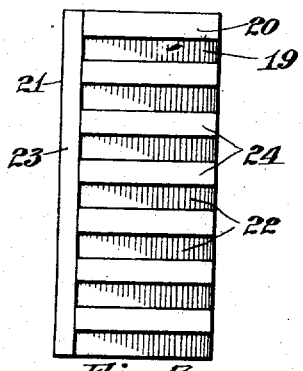
Figure 6:
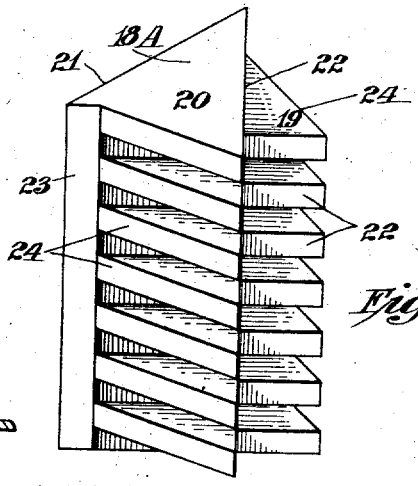
Figure 9:
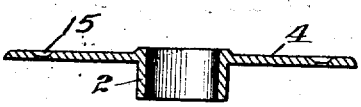

Figure 1 is a side elevation of a chair base embodying one form of my invention; Fig. 2, is a top plan view with the upper plate removed, showing the relation of the various parts; Fig. 3 is a perspective view of the end of one of the legs; Fig. 4 is a side elevation of the end shown in Fig. 3; Fig. 5 is a section on the line 5—5, Fig. 2; Fig. 6 is a perspective view of one of the blocks; Figs. 7 and 8 are a side elevation and a top view respectively of the block shown in Fig. 6; and Fig. 9 is a section through one of the plates.

As shown in Fig. 1, the base 1 is of the usual type, having four legs A, B, C and D provided with the usual casters 3, and having top and bottom plates 4 which serve as bearings for the spindle of the chair seat (not shown). These plates as shown in Fig. 9, have short sleeves 2 which serve as bushings for the spindle. They are also provided with holes 15 adapted to receive the screws to fasten them to the legs.

The construction and joining of the inner ends of the legs to make a secure and satisfactory joint are the points of particular interest in the present instance and in accordance with my invention I provide the inner end of each leg with a vertical series of tenons having mortises, therebetween, the said tenons being engaged by tenons formed on locking blocks which are placed between each two adjacent legs. As shown in Fig. 3, the inner end 5 of one of the legs is shown. In this particular embodiment of the invention the inner end of the leg is formed with a series of staggered tenons 6 and 7 ending in blunt or cut off ends 8. Each tenon 6 has its outer face 9 in the plane of the side of the leg while its inner face 10 is formed at an angle of 30° thereto. The opposite tenons 7 are similarly formed with faces 11 in the plane of the side and faces 12 at an angle of 30° thereto. Thus the end has a forked appearance, the tenons alternating first on one side and then the other, as is clearly shown in Figs. 3 and 4.

The ends 8 of two opposite legs are in the same vertical plane, while the tenons of each two adjacent legs interengage over a portion of their area. The legs when thus assembled have a hexagonal opening 13 at their center, as shown in Fig. 2.

The two adjacent legs A and B have their tenons 6 and 7 interengaging over the area *a*, *b*, *c*, and *d*, leaving the areas *a*, *b*, *e* and *b*, *c*, *f*, disengaged for the purpose to be later set forth. Each adjacent pair of legs is thus in engagement and the four legs are locked tightly together.

The blocks $18^A$, $18^B$, $18^C$ and $18^D$ also have forked ends with alternating triangular tenons 19 and 20. These blocks have each a base portion 21, the inner faces 22 of the tenons being continuations of the sides 23 of this base portion, while the outer faces 24 are set at an angle to the sides 23. As seen, these tenons are triangular in shape and alternate as do the tenons on the ends of the legs. The faces 22 are cut at an angle of 45° to the base line, while the outer faces 24 are at an angle of 75° to the base of the block.

The blocks fit in between adjacent legs, the tenons of the blocks fitting into the disengaged portions of the tenons of the legs as will be readily seen from Figs. 2 and 5. Thus in Fig. 2, the block $18^A$ is engaged with the two legs A and B over the areas *a*, *e*, *b* and *b*, *c*, *f*, respectively, thus making a solid joint and interlocking the legs together so that the legs resist movement in every direction except outwardly along their median lines.

It will be seen that the base portion *m*, *n*, *e*, *f* extends beyond the cuts in the legs and thus conceals the joint. As the block is smooth over the faces *e*, *n* and *m*, *f*, it makes a close fit with the smooth faces of the legs and a neat satisfactory joint results.

The use of the angles mentioned allows the block to entirely fill the spaces between the tenons on the legs so that a solid base results, as shown in section in Fig. 5. As stated before, at the center of the base a hexagonal opening 13 is left which is bored out to form the hole 30 (shown in dotted lines on Fig. 2) for the seat spindle.

It will be understood that the parts may or may not be glued before assembling and then forced into place, the legs and blocks being cut so as to secure a tight fit and glue, when used, serving to aid in making a secure joint.

The parts are preferably machine cut to secure accuracy and as the cuts or angled sides of both the tenons on the legs and blocks are covered by the base portion of the blocks, slight irregularities in cutting are concealed and a satisfactory joint obtained. The assembly of the members is facilitated. The resulting chair base is strong and does not come apart or become loose after use as the plates are screwed or otherwise fastened to the legs, which adds to the strength of the finished base.

Other modes of applying the principle of my invention (which consists in the interengagement of the leg and block tenons) may be employed instead of the one explained, change being made as regards the mechanism herein disclosed, providing the means stated by any of the following claims or the equivalent of such stated means be employed.

I, therefore, particularly point out and distinctly claim as my invention:—

1. A chair base, comprising legs having a plurality of oppositely disposed tenons on their inner ends and adapted to interengage over portions of the areas of said tenons, and a series of blocks formed with similarly disposed tenons, adapted to interengage with the tenons on said legs to form a solid joint.

2. A chair base, comprising legs having a plurality of oppositely disposed tenons on their inner ends and adapted to interengage over portions of the areas of said tenons, and a series of blocks formed with similarly disposed tenons, said blocks being adapted to fit snugly between adjacent legs and to interengage with the unengaged portions of said tenons on said legs to form a solid joint.

3. A chair base, comprising legs having a plurality of oppositely disposed staggered tenons on their inner ends, the tenons of two adjacent legs being adapted to interengage over portions of their areas, and a series of locking blocks provided with similarly disposed staggered tenons, said blocks being adapted to fit snugly between adjacent legs and the tenons on said blocks being adapted to interengage with the unengaged portions of the tenons on the legs.

4. A chair base, comprising legs having a plurality of oppositely disposed staggered tenons on their inner ends, the tenons of two adjacent legs being adapted to interengage over portions of their areas, and a series of locking blocks provided with similarly disposed triangular shaped staggered tenons, said blocks fitting snugly between adjacent legs and having their tenons interengaged with the unengaged portions of the tenons on the legs to form a solid joint.

5. A chair base, comprising legs having a plurality of oppositely disposed staggered tenons on their inner ends, the tenons of two adjacent legs being adapted to interengage over portions of their areas, and a series of locking blocks each having a base portion and a plurality of similarly disposed triangular shaped tenons arranged in staggered relation, the blocks being adapted to fit snugly between adjacent legs and having their tenons interengaging with the unengaged portions of the tenons on the legs to form a solid joint, the base portions of the blocks being adapted to conceal the juncture of the tenons on the legs and blocks.

6. A chair base, comprising legs having forked inner ends provided with a plurality of tenons disposed alternately on the two prongs of each fork, the adjacent legs being adapted to have their adjacent rows of tenons interengaging over portions of their areas, and a series of locking blocks also provided with two series of alternately disposed triangular shaped tenons, the blocks being adapted to fit snugly between adjacent legs and to have their tenons interengaging with the unengaged portions of the tenons on the legs to form a solid joint.

7. A chair base, comprising legs having forked inner ends provided with a plurality of tenons disposed alternately on the two prongs of each fork, the adjacent legs being adapted to have their adjacent rows of tenons interengaging over portions of their areas, and a series of locking blocks each having a base portion and two series of alternately disposed triangular shaped tenons, the blocks being adapted to fit snugly between adjacent legs and to have their tenons interengaging with the unengaged portions of the tenons on the legs to form a solid joint, said base portions of said blocks being adapted to conceal the interengagement of said tenons of said legs and blocks.

8. A chair base, comprising legs having a plurality of tenons arranged in vertical series on their inner ends, and blocks having tenons arranged in vertical series adapted to engage with the tenons on the legs.

9. A chair base, comprising legs each having a vertical series of tenons and intervening mortises at its inner end, and locking blocks each having a vertical series of tenons and intervening mortises on one face thereof, the blocks being adapted for insertion between adjacent legs and the tenons on the blocks being designed to enter the mortises between the tenons on the legs and to engage with said last mentioned tenons.

10. A chair base, comprising a plurality of legs arranged substantially at right angles to each other and provided with spaced tenons on their inner ends, and locking blocks insertible between adjacent legs and having tenons engageable with the tenons of the legs.

11. A chair or other base, comprising a series of legs provided at their inner ends with inwardly disposed tenons, and connecting filler-blocks arranged between said legs, said blocks having their inner faces provided with a series of tenons spaced apart to form intermediate mortises, said tenons being staggered with relation to the tenons of the legs.

Signed by me this 3rd day of May 1921.

THOMAS W. FOOTE.